Fig. 11.

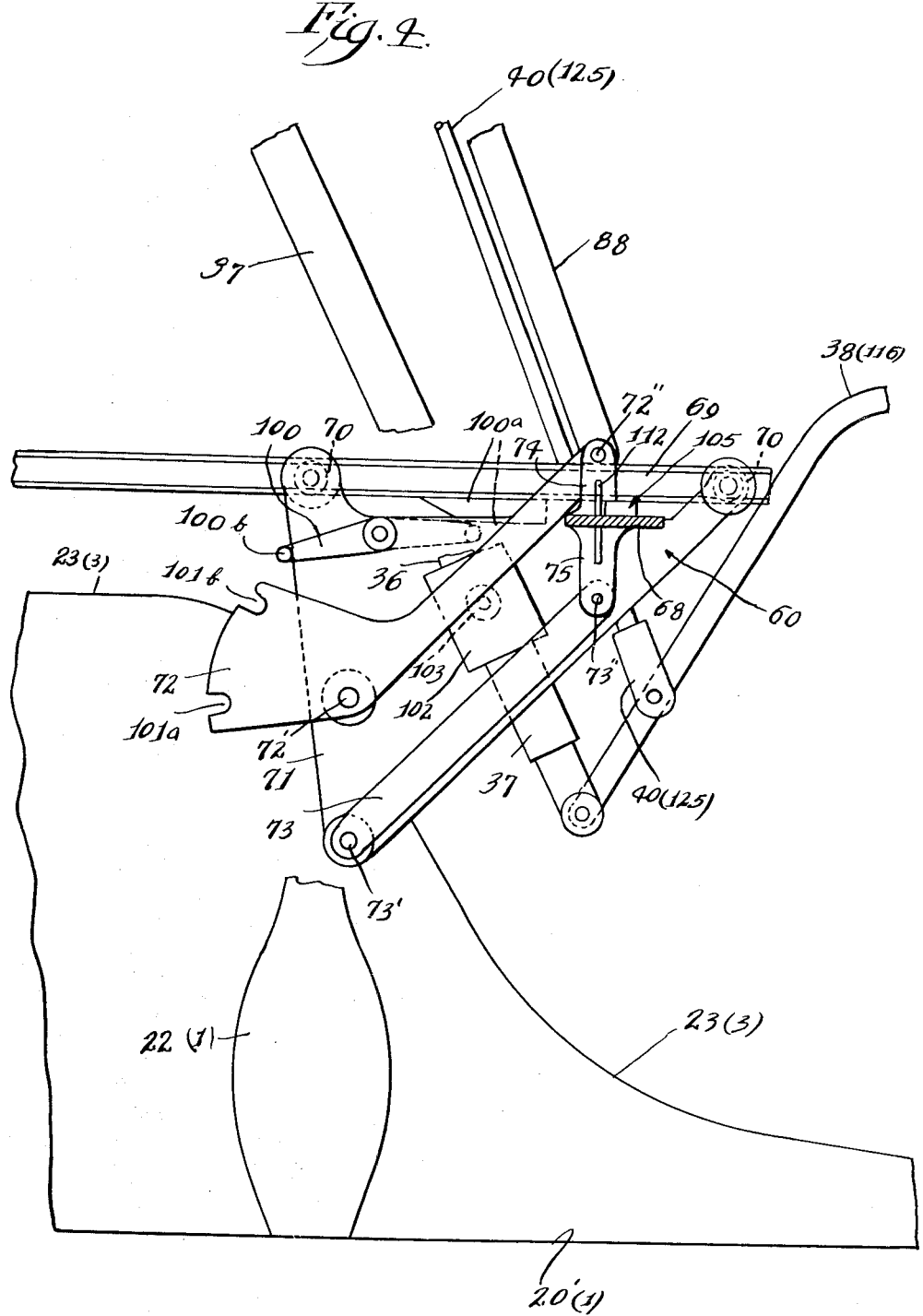

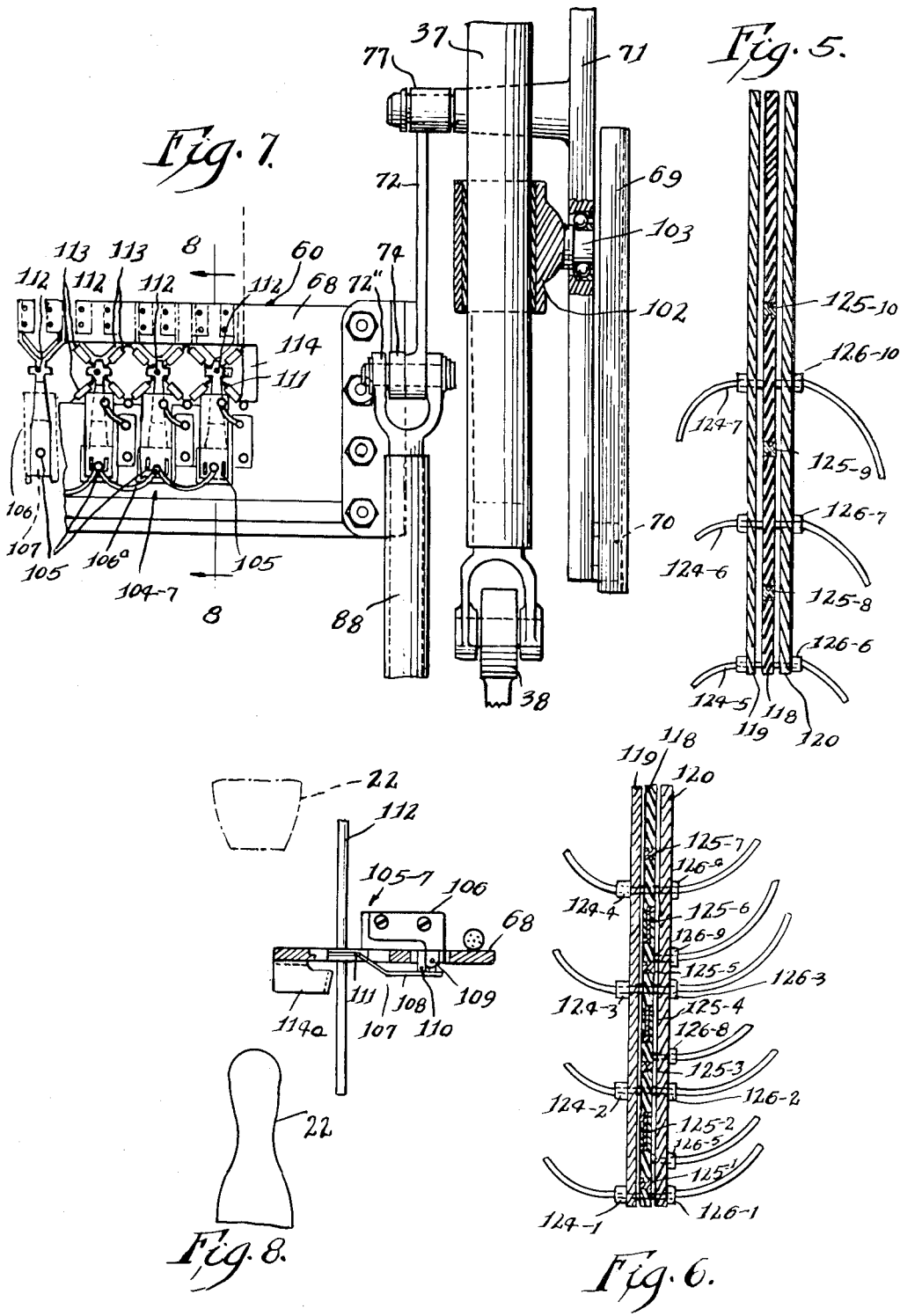

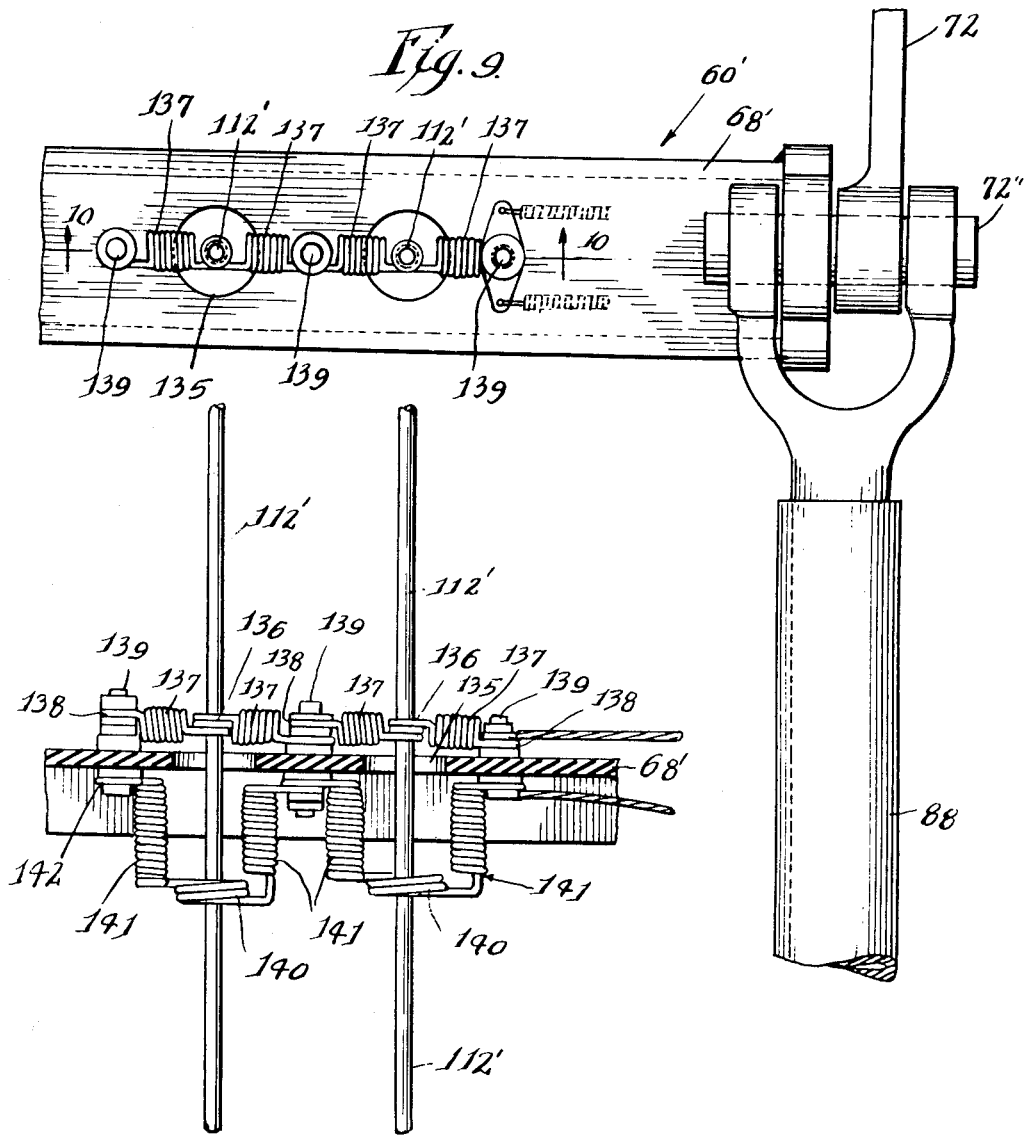

United States Patent Office 3,251,597
Patented May 17, 1966

3,251,597
PIN DETECTING APPARATUS MOVABLE HORIZONTALLY AND LONGITUDINALLY OF A BOWLING ALLEY
James B. E. Saunders, New Canaan, Conn., assignor to Brunswick Corporation, a corporation of Delaware
Original application Dec. 22, 1961, Ser. No. 161,654. Divided and this application July 3, 1963, Ser. No. 292,562
6 Claims. (Cl. 273—43)

This is a sole division of application Serial No. 161,654 filed December 22, 1961, by Donald E. Roop and James B. E. Saunders.

This invention relates to apparatus for detecting pinfall during a bowling game, and more particularly to apparatus for detecting standing pins after the first and second balls of each frame, and to such apparatus particularly suited for use in conjunction with automatic pinsetters.

A primary object of this invention is to provide a new and improved apparatus for detecting pinfall during a bowling game.

During recent years bowling has become an increasingly popular sport and diversion and many bowling establishments are now in operation. Almost all successful bowling alley establishments are equipped with automatic pinsetters which set pins, clear the alley of fallen pins, or "deadwood," after each ball of a frame, temporarily lift standing pins off the bowling alley after the first ball of a frame so that the deadwood may be removed, and then replace these standing pins prior to the second ball of the frame.

It is often difficult for a bowler to determine precisely which pins are still standing after bowling a ball. For example, one ten pin may be directly behind another pin, or may be moved slightly off its pin spot on the alley, so that a bowler standing by the foul line at the opposite end of the alley might be confused. To overcome this difficulty various pin detecting and indicating mechanisms have been devised for indicating the positions of standing pins. Other indicators signal numerical pinfall following each ball and/or each frame while other mechanisms totalize and indicate cummulative scores.

Many detecting mechanisms have proven to be unreliable in service, either because they are inaccurate or require excessive routine maintenance, or because they are too expensive. Many satisfactory pin detecting mechanisms have been developed, but most of these are dependent on modification of pinsetter cycling and increase the cycling time and operation of the pinsetter. For example, with some standing pin detectors the pinsetter deck structure must lower so that the detectors may engage the heads of standing pins on the bowling alley, but after the second ball of a frame such operation of the pinsetter is not otherwise required, because most pinsetters only clear deadwood from the bowling alley after the second ball of a frame. To avoid altering the pinsetter cycle, many pin detecting and indicating mechanisms are only operative to indicate standing pins after the first ball of a frame.

An important object of this invention is to provide new and improved apparatus for detecting standing pins after both the first and second balls of a frame.

Another object is to provide a new and improved pin detecting apparatus for use in conjunction with automatic pinsetters.

Still another object is to provide a new and improved pin detector operated in conjunction with pinsetter mechanism for clearing deadwood from a bowling alley, so that standing pins may be detected after both the first and second balls of a frame.

A further object is the provision of new and improved standing pin detecting apparatus having a sensor for scanning and determining the position of standing pins laterally of the bowling alley, and an indexing mechanism for determining the position of the sensor longitudinally of the alley such that standing pins may be accurately identified. A related object is provision of cooperating means for indicating which pins are standing after both the first and second ball of a frame.

A still further object is provision of new and improved standing pin detecting apparatus actuated by mechanical linkage.

Still another object of this invention is to provide new and improved pin detecting and indicating apparatus which is both accurate and durable, and economical to manufacture and operate.

Other objects and advantages will become readily apparent from the following detailed description taken in connection with the accompanying drawings, in which:

FIGURE 4 is an enlarged view of a portion of FIGURE 2, with parts broken away for clearer illustration;

FIGURE 5 is an enlarged, sectional, developed view of an outer ring of a commutator forming part of the apparatus;

FIGURE 6 is an enlarged, sectional developed view of an inner ring of the commutator;

FIGURE 7 is an enlarged, fragmentary plan view of an embodiment of a sensor portion of the apparatus, with parts broken away and removed for clearer illustration;

FIGURE 8 is a vertical sectional view taken generally along the line 8—8 of FIGURE 7, and illustrates operative association of the sensor mechanism with the head of a standing pin on the bowling alley, and with a standing pin lifted off of the bowling alley and shown in phantom lines;

FIGURE 9 is an enlarged, fragmentary plan view of another embodiment of a sensor portion of the apparatus;

FIGURE 10 is a vertical sectional view taken generally along the line 10—10 of FIGURE 9; and FIGURE 11 is a diagrammatic view of an embodiment of an electric circuit including an embodiment of indicator apparatus.

Figure 1:
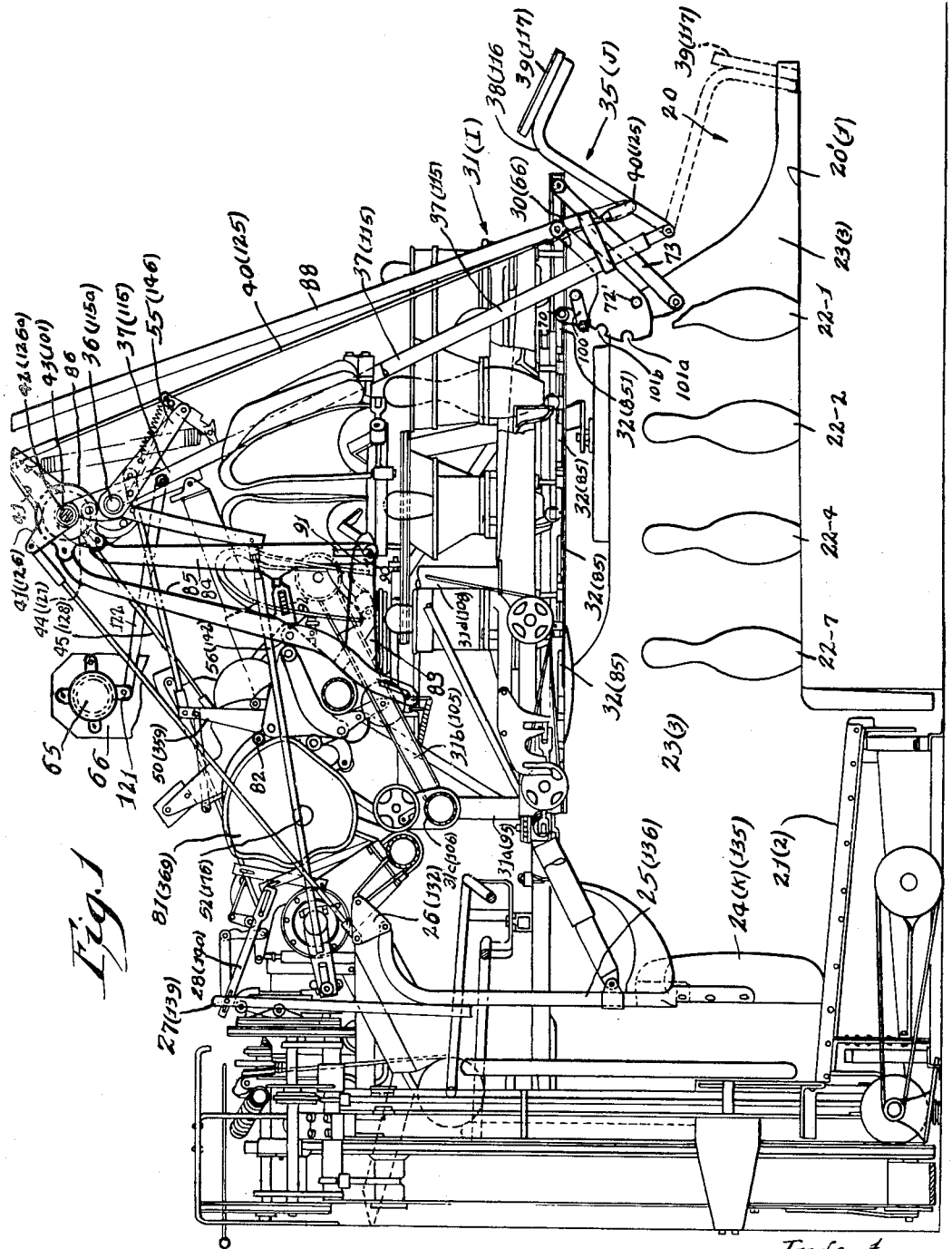
FIGURE 1 is a side elevational view of a pin detecting apparatus, embodying features of the invention, and illustrated in conjunction with an automatic pinsetter installed on a bowling alley, with parts broken away for clearer illustration.

While illustrative embodiments of the invention are shown in the drawings and will be described in detail herein, the invention is susceptible of embodiment in many different forms, and it should be understood that the present disclosure is to be considered as an exemplification of the principles of the invention and is not intended to limit the invention to the embodiments illustrated. The scope of the invention will be pointed out in the appended claims.

The invention is, in brief, directed to a standing pin detecting and indicating apparatus in which a sensor operates longitudinally of a bowling alley for determining the lateral position of standing pins, and an indexing mechanism determines the longitudinal position of the sensor. Cooperating means, including the sensor and indexing mechanism, indicate which pins are standing after a ball has been bowled. The pin detecting apparatus is actuated after each ball of a frame, and after the first ball this apparatus detects pins lifted off the bowling alley prior to removal of deadwood from the alley by a suitable rake mechanism, and after the second ball of a frame this apparatus detects standing pins on the bowling alley, again prior to removal of deadwood. In the preferred embodiment of the invention the pin detecting apparatus is operated in part by rake operating mechanism and in part responsive to pinsetter actuating mechanism which differentiates between the first and second balls of a frame for properly actuating the pin detecting apparatus along with the pinsetter. The indicating apparatus is operated by the detecting apparatus and provides a suitable signal, such as a light, for indicating which pins are standing after both the first and second balls of a frame. The indicating apparatus is provided wth suitable holding circuits for maintaining the indicators in operation following the first ball of a frame and until the second ball is bowled, and with a timer for limiting operation of the indicators after the second ball of the frame, or after a strike.

Preferred embodiments of the invention are illustrated in conjunction with an automatic pinsetter, and more particularly in conjunction with a Brunswick pinsetter which is fully illustrated and described in United States Letters Patent 2,949,300 to Huck et al. Reference should be had to this patent for a full understanding of the pinsetter operation, which will be but briefly described herein as related to operation of the standing pin detecting and indicating apparatus. In the following description reference numerals of the Huck patent are shown in parenthesis to expedite reference to this patent.

*The bowling alley and pinsetter*

Figure 2:
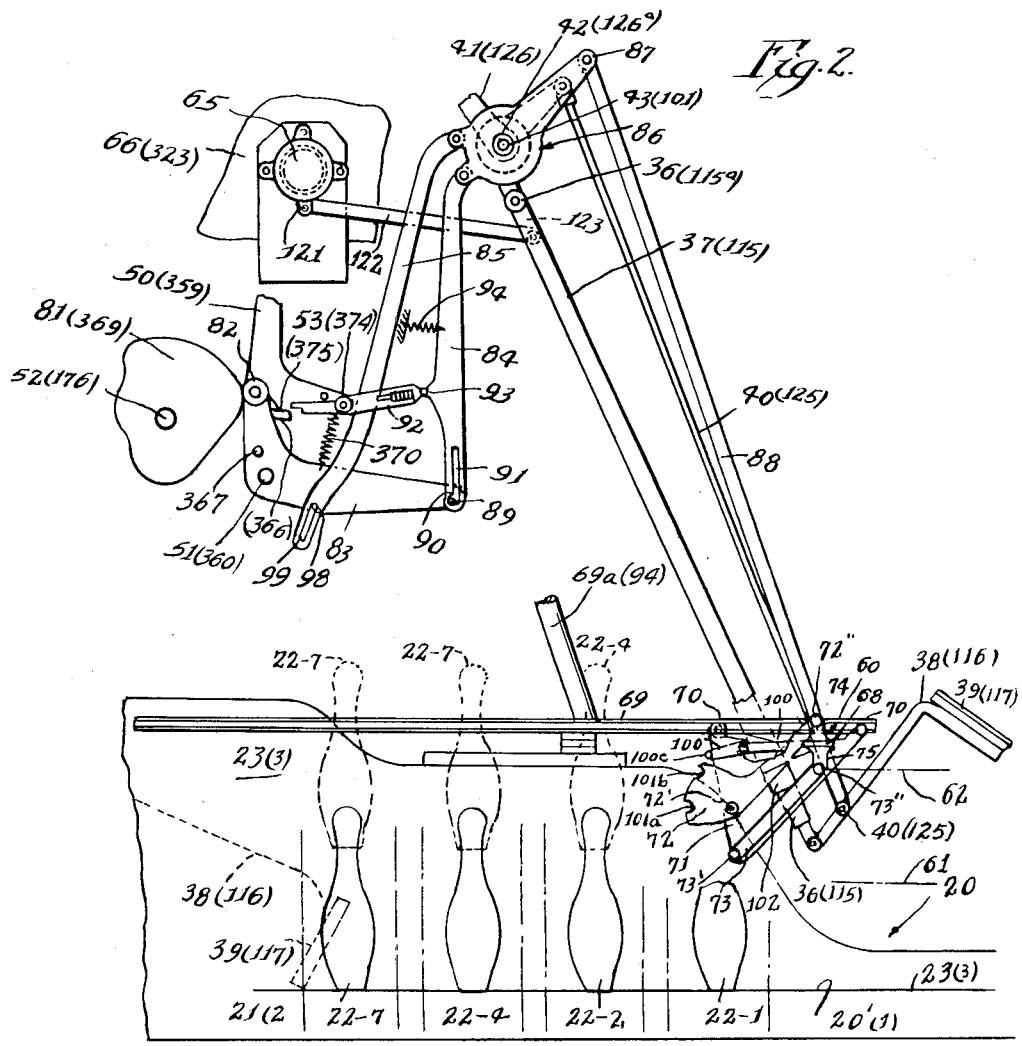
FIGURE 2 is a broken, schematic, side elevational view of the pin detecting apparatus and automatic pinsetter, with parts broken away and removed for clearer illustration.
Figure 3:
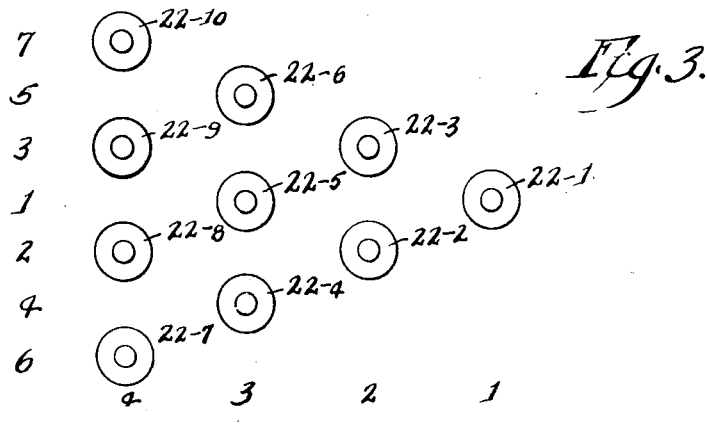
FIGURE 3 is a plan view of a conventional ten pin arrangement on the bowling alley, and is illustrated as a projection from FIGURE 2.

Referring to the drawings, FIGURES 1 and 2 show the rear portion of a bowling alley 20 having a bowling alley bed 20' (1) terminating at its rear end in a pit 21 (2). FIGURES 1–3 show a complete complement of ten pins 22-1—22-10 positioned on the bowling alley in conventional manner over suitable pin spots (not shown) on the bed. Side wall or kickbacks 23 (3) are suitably secured at either side of the bowling alley to prevent the pins from being knocked away from the alley when they are hit by a bowling ball.

An automatic pinsetter is suitably installed at the rear or pit end of the bowling alley 20. As is more fully described in the Huck patent, the pinsetter is provided with actuating mechanism which operates the pinsetter for setting pins initially, lifting all standing pins 22 off bowling alley 20 after the first ball of each frame and then clearing any deadwood (fallen pins) from the alley, and resetting the lifted standing pins, preparatory to bowling the second ball of a frame. In the event of a strike, the actuating mechanism operates the pinsetter to clear the alley of deadwood and set a complete complement of ten pins after the first ball. After the second ball of each frame, the actuating mechanism sets the pinsetter in operation to clear all pins, standing or fallen, from the bowling alley, and then a new complement of ten pins 22 is set.

The actuating mechanism for the pinsetter includes a pit cushion 24(K) (135) in pit 21 rearwardly of and facing the rear end of the bowling alley bed 20'. Pit cushion 24 is secured to a pair of upwardly extending bars 25 (136) which are each pivotally suspended from triangularly shaped plates 26 (132) of the pinsetter. An upwardly extending rod 27 (139) is secured at its lower end to one of the bars 25 for rotation therewith, and is connected at its upper end with a clutch link 48 (140) for operating an actuating mechanism clutch when pit cushion 24 is rotated (clockwise in FIGURES 1 and 2) upon being hit by a bowling ball.

As the first ball of a frame strikes pit cushion 24 to set the actuating mechanism in operation, a lower plate 30 (66) of a deck structure 31(I) is lowered. Deck 31 is supported from frame member 31a (95) by upper drive arms 31b (105) located at each side of the alley and connected at one of their ends to a tubular sleeve 31c (106) rotatably mounted at one end on stubs secured to the vertical frame members 31a and at their other ends pivotally connected to posts 31d (108) extending upwardly from opposite sides of the deck. As is fully described in the aforementioned Huck patent, lower drive rods (not shown) are pivotally connected between frame members 31a and posts 31d, and raising and lowering of the deck is controlled by rotation of sleeve 31c. With the deck lowered a pick-up mechanism grasps any standing pins 22, whether on or off their respective pin spots, and as the deck is raised, responsive to rotation of sleeve 31c, these standing pins are lifted off the bowling alley bed 20'. After other operations of the pinsetter, the deck is again lowered, and the lifted pins are set in the precise position on bed 20' from which they were lifted. This mechanism includes ten scissor type pick-up devices 32 (85), one for each of the ten pins 22-1—22-10, which clamp around the neck of the respective pin 22 if it is still standing on the bowling alley. Lower plate 30 is then elevated, lifting the standing ten pins off of the deck and to the position shown by dotted lines in FIGURE 2. Suitable mechanism is provided to prevent operation of this pick-up mechanism upon occurrence of a strike, or after the second ball of a frame. Such pick-up mechanism is shown in the aforementioned Huck patent, and in Sanford patent No. 2,817,528.

*The rake mechanism*

Deadwood is cleared from the alley after each ball by a rake mechanism 35(J). This rake mechanism includes a sleeve 36 (115a) mounted on a frame portion of the pinsetter for rotation about a substantially horizontal axis. A pair of rake supporting rods 37 (115) are secured to sleeve 36 for rotation therewith and depend from this sleeve at opposite sides of the bowling alley for oscillation longitudinally of the alley, as will be described hereinafter. A pair of rake support arms 38 (116) carry a rake board 39 (117) at one end and are pivotally connected at an opposite end, one to the lower end of each support rod 37, for pivotal movement of the rake board from an elevated position shown in solid lines in FIGURES 1 and 2, to a lowered guard and rake position shown by dotted lines in FIGURE 1. Rake board 39 is normally maintained in an elevated position by a pair of links 40 (125) at opposite sides of the alley. These links are pivotally connected at their lower ends with an adjacent support arm 38 and at their top ends with bell cranks 41 (126). Bell cranks 41 are rigidly connected with each other by a sleeve 42 (126a) rotatably mounted on stubs 43 (101) secured to a frame portion of the pinsetter. Thus, the elevation of rake board 39 is controlled by rotation of sleeve 42.

Rotation of sleeve 42 to raise and lower rake board 39 is effected through an arm 44 (127) (FIGURE 1) rigidly connected at one end to sleeve 42 and pivotally connected at an opposite end to a connecting link 45 (128). Link 45 is connected with the actuating mechanism for normally holding sleeve 42 in such position that rake board 39 is normally elevated as shown by solid lines in FIGURE 1.

Link 45 is reciprocated by the actuating mechanism to raise and lower the rake board 39 and is pivotally connected with a cam follower arm 50 (359) (FIGURES 1 and 2) at an end opposite its connection with arm 44. This cam follower arm is pivoted on a pin 51 (360) (FIGURE 2) secured to a portion of the pinsetter frame, and has a roller (not shown) (362) urged into engagement with a suitable cam (not shown) (363) mounted on a shaft 52 (176) for rotation therewith. Each time the actuating mechanism sets the pinsetter in operation, in response to a bowling ball striking pit cushion 24, shaft 52 makes one revolution. The follower of cam follower arm 50 moves from its normal position onto a low portion of its cam, thus rotating arm 44 and sleeve 42 clockwise, as seen in FIGURES 1 and 2, to lower rake board 39 to its guard position, as shown by the dotted lines in FIGURE 1. For a purpose related to other functions of the pinsetter, over cycling of the pinsetter occurs after the first ball of a frame striking the pit cushion 24. In the event of a strike such over cycling does not occur. The reason for such over cycling is discussed in the Huck patent, and with regard to the present invention it is only necessary to note that a shaft 53 (374) (FIGURE 2) is rotatably mounted on cam follower arm 50 and is rotated counterclockwise from the position shown in FIGURE 2, toward the end of first ball operation of the pinsetter in a no strike situation.

Oscillation of rake board 39 longitudinally of the alley is effected as follows. When lowered to the guard position as shown by the dotted lines in FIGURE 1, rake board 39 is caused to sweep longitudinally rearwardly across the bowling alley to the dotted line position shown in FIGURE 2, and then back to the guard position, all in response to back and forth rotation of sleeve 36 oscillating rake support rods 37. Such rotation of sleeve 36 is effected by the actuating mechanism acting through an arm unit 55 (146) rigidly connected at one end with sleeve 36 and having means at the other end for releasable connection with a crank link 56 (142) of the actuating mechanism, as is fully described in the Huck patent.

To summarize the operation of the rake mechanism, the actuating mechanism is responsive to a bowling ball striking pit cushion 24 to effect lowering of rake board 39 to its guard position shown in dotted lines in FIGURE 1, to then sweep the rake board longitudinally rearwardly of the bowling alley to clear deadwood from the alley, and then to return rake board 39 to its elevated position as shown by the solid lines in FIGURE 1. This action occurs after both the first and second ball of each frame, and in fact any time a bowling ball hits pit cushion 24. On the first ball of a frame the rake action occurs after the scissor devices 32 have lifted any standing pins off of the bowling alley. Thus, means responsive to bowling of each ball of a frame are provided for moving rake support arms 37 longitudinally rearwardly across the rear portion of bowling alley 20, and to return these arms to their original position.

*The pin detecting and indicating apparatus*

With particular reference to FIGURES 1, 2 and 4, apparatus for detecting standing pins after first and second balls of a frame includes cooperating means in the form of sensor means which sweeps longitudinally of bowling alley 20 to determine the lateral position of any standing pins, and index means to determine the position of the sensor means longitudinally of the alley and therefore the longitudinal position of these standing pins. By integrating these determinations all standing pins may be identified.

The sensor means includes a sensor mechanism 60 movable in elevation between a storage position, shown by the solid lines in FIGURE 2, a first ball position 61, and a second ball position 62, as indicated by center lines in FIGURE 2. In both the first and second ball positions, sensor 60 is movable longitudinally rearwardly of the bowling alley for determining the position of standing pins laterally of the bowling alley. After the first ball of a frame the sensor 60 moves to its first ball position 61, and then moves longitudinally rearwardly with respect to the bowling alley after any standing pins 22 have been lifted from bowling alley bed 20' by the scissor pick-up mechanism 32. Thus, in first ball position sensor 60 passes below and engages the bottoms of any standing pins. After the second ball of a frame sensor 60 moves to its second ball position 62, which is higher than its first ball position 61, and then moves longitudinally rearwardly across the tops of any standing bowling pins 22 and engages the standing pin heads for determining their position laterally of the bowling alley. In the preferred embodiment, operation of the pin detecting apparatus is controlled by the pinsetter actuating mechanism and is started by a bowling ball striking pit cushion 24 to set the actuating mechanism in operation, as previously discussed.

The indexing means are in the form of a commutator 65 secured to a mounting plate 66 (323) of the pinsetter, for determining the position of sensor 60 longitudinally of bowling alley bed 20'.

With reference to FIGURES 2 and 3, it will be seen that there are four rows of pins extending laterally across bowling alley bed 20', and containing the following pins; row 1, pin 22–1; row 2, pins 22–2 and 22–3; row 3, pins 22–4—22–6; and row 4 pins 22–7—22–10. There are seven columns of pins extending longitudinally of the bowling alley, as follows: column 1, pins 22–1 and 22–5; column 2, pins 22–2, and 22–8; column 3, pins 22–3, and 22–9; column 4, pin 22–4; column 5, pin 22–6; column 6, pin 22–7; and column 7, pin 22–10. The sensor 60 accurately determines the column of any standing pin, and the commutator 65 simultaneously accurately determines the longitudinal position of sensor 60 and therefore the row containing a standing pin. By integrating these two determinations all standing pins may be accurately identified.

*The sensor*

As illustrated in FIGURES 1, 2, 4, 7, and 8, sensor 60 includes a sensor beam 68 extending laterally across bowling alley bed 20'. This beam is mounted for movement vertically and longitudinally above the bowling alley. The mounting includes a pair of opposed tracks 69 extending longitudinally of the alley. Each track is secured at its rear end to the adjacent kickback 23 and at its front end to an adjacent pinsetter frame rod 69a (94). These tracks are preferably of channel or generally U-shaped cross sectional configuration and open inwardly toward each other. Each track receives a pair of rollers 70 rotatably secured to a depending traveler 71, thereby mounting the travelers for reciprocal movement longitudinally of the bowling alley. Each traveler 71 carries a pair of parallel arms including an upper arm 72 and a lower arm 73 extending in the same direction from pivotal connections 72' and 73', respectively, mounting the arms on their travelers for rotation about generally horizontal axes. Opposite ends of the arms of each pair are pivotally connected, for rotation about a generally horizontal axes, with an adjacent end of sensor beam 68, and more particularly arm 72 is connected by a pivot 72" with an ear 74 extending upwardly from the adjacent end of sensor bar 68, and lower arm 73 is pivotally connected at 73" with an ear 75 depending from the adjacent end of sensor 68. This mounting maintains sensor bar 68 substantially horizontal while providing for generally vertical movement of the sensor bar with respect to the bowling alley.

In the preferred embodiment, sensor 60 is moved vertically with respect to the bowling alley between its storage position, first ball position 61, and second ball position 62, by a mechanical linkage. A cam 81 (369) is mounted on shaft 52 for rotation therewith, and as previously described, this shaft makes one revolution each time the actuating mechanism is set in operation by a bowling ball striking pit cushion 24. Prior to operation of the actuating mechanism, a cam follower roller 82 on a sensor drive arm 83 bears on the high portion of cam 81. Sensor drive arm 83 is pivotally mounted on pinsetter pin 51 for rotation about a horizontal axis, and upon rotation of cam 81 the follower 82 rides onto a low portion of the cam permitting drive arm 83 to rotate counter-clockwise as viewed in FIGURE 2. Drive arm 83 is connected by pivotal lost motion connections with the lower ends of a first ball drive link 84 and a second ball drive link 85. Upper ends of links 84 and 85 are pivotally connected with separate ears of a sensor idler crank 86. This idler crank is freely mounted for rotation about a horizontal axis on stub shaft 43 of the pinsetter. An arm 87 of crank 86 is pivotally connected with the upper end of a sensor link 88 which is pivotally connected at its lower end with pivot 72" for moving sensor bar 68 vertically.

The connection between drive arm 83 and drive link 84 includes a pivot pin 89 on the drive arm 83. During first ball operation of the pinsetter, pin 89 is held in a notch 90 in drive link 84, and during second ball operation of the pinsetter, pin 89 is slidably received in an elongated slot 91 in drive link 84. This slot opens into notch 90. The retention of pin 89 in notch 90 during first ball operation is facilitated by a drive link selector finger 92 having an adjustable tip engaging a high portion of a cam 93 on link 84 and maintaining the drive link in a right-hand position as shown in FIGURE 2, and against the urging of suitable resilient means, such as a spring 94, urging drive link 84 to the left. Finger 92 is secured to the shaft 53 for rotation therewith. As previously mentioned, and described in the aforementioned Huck patent, during the first portion of first ball operation of the pinsetter this shaft is positioned for maintaining finger 92 in engagement with the high portion of drive link cam 93 so that drive arm pin 89 is releasably held in drive link notch 90, and link 84 moves with drive arm 83. Thus, as drive arm follower 82 moves onto the low portion of cam 81, drive arm 83 rotates counterclockwise to move drive link 84 upwardly and rotate sensor idler crank 86 clockwise, thereby moving sensor beam 68 to its first ball position 61. After sensor 60 has swept longitudinally of the alley and returned to the position shown in FIGURE 2, and if a no strike situation exists, shaft 53 rotates as previously mentioned, and described in the Huck patent, to release finger 92 from the high portion of drive link cam 93 whereupon spring 94 moves this drive link toward the left releasing drive arm pin 89 from notch 90 and positioning this pin for movement longitudinally in slot 91 so that first ball link 84 is no longer driven upwardly by pin 89.

During second ball operation of the pinsetter, finger 92 is free of the high portion of drive link cam 93 and drive arm pin 89 is in drive link slot 91. When drive arm follower 82 now moves onto the low portion of cam 81 the second ball drive link 85 is controlling. As previously mentioned, second ball drive 85 has a pivotal lost motion connection with drive arm 83. This connection includes a pin 98 on the drive arm freely received in a slot 99 in the second ball drive link 85. This slot is shorter than first ball drive link slot 91. As sensor drive arm follower 82 moves onto the low portion of cam 81 second ball drive link 85 moves upwardly and acting through selector link 88 moves sensor beam 68 to its second ball position 62. Thus, means is provided for moving the sensor to first and second ball positions responsive to bowling first and second balls of a frame, and more particularly responsive to first and second ball operation of the pinsetter.

As best shown in FIGURE 4, means for releasably locking sensor 60, and more particularly sensor beam 68 in first and second ball positions 61 and 62, is provided in the preferred embodiment in the form of a position lock lever 100 pivoted on a traveler 71. Lever 100 has a front end normally depressed by a cam block 100a on the underside of the adjacent track 69, so that a lug 100b which extends transversely outwardly from the rear end of lever 100 is rotated to an elevated position. As the sensor moves rearwardly from its normal forward position over the bowling alley the lever 100 rides off of a beveled rear end of cam 100a and onto the lower face of track 69, and lug 100b is received in one of two cooperating notches in the end of arm 72 adjacent pivot 72' to lock the sensor in first or second position. In first ball position lug 100b is received in a notch 101a, and in second ball position this lug is received in notch 101b. As the sensor returns to its normal forward position the front end of lever 100 rides down the beveled rear end of cam 100a and lug 100b is released from the notch for vertical movement of the sensor, as previously described.

In the preferred embodiment, means is provided for movement of sensor 60 longitudinally of the bowling alley in response to first and second ball operation of the actuating mechanism, and more particularly by connection of rake arms 37, on either side of the pinsetter, with the adjacent traveler 71. Each rake arm 37 is telescopically received in a sleeve 102 having a pivotal connection 103 with the adjacent traveler 71. Thus, as rake 39 sweeps across the bowling alley the rake arms 37 telescope downwardly through sleeves 102 and move the travelers 71 and sensor 60 along with the rake. As is obvious in FIGURES 1 and 2, sensor 60 moves rearwardly past pins 22 before rake 39 contacts the pins. In the preferred embodiment the timing of the actuating mechanism is such that sensor 60 is positioned in either its first or second ball position before it is swept longitudinally rearwardly with respect to the bowling alley.

Sensor 60 has means for detecting standing pins, and in the embodiment illustrated in FIGURES 7 and 8 this means is in the form of seven groups of switches, 104–1—104–7, one for each of the seven columns of the ten pins 22–1—22–10. In the illustrated embodiment these groups each have four switch assemblies 105. Each switch assembly 105 has a switch 106 mounted on sensor beam 68. The switches of each group are connected in parallel circuit with each other as by wiring illustrated physically at 106a (FIGURE 7). An actuator portion 107 of each switch includes an arm 108 pivotally connected at 109 with the respective switch body for vertical movement to operate a plunger 110 telescoped in and depending from the switch for opening and closing contacts thereof. A free end of arm 108 is secured to a collar 111 mounting a pin sensing actuator arm 112. Each collar 111 and arm 112 is resiliently supported, in the preferred embodiment, by resilient means here in the form of four tension springs 113. Opposite ends of each spring 113 are connected with the respective collar 111 and sensor beam 68 so that arms 112 may be deflected. These arms extend through a slot 114 in sensor beam 68, and all arms 112 are in a substantially straight row extending laterally of the bowling alley. In the preferred embodiment actuator arms 112 are equally spaced laterally of the bowling alley, and are about 1⅜ inches apart, for contacting pins whether on or off spot. Upper ends of arms 112 are positioned to engage and be deflected by the bottom of standing pins held in scissor mechanisms 32 as sensor 60 sweeps longitudinally rearwardly over the bowling alley when in its first ball position 61; and the bottom ends of arms 112 are positioned to engage and be deflected by the heads of pins 22 standing on bowling alley as sensor 60 sweeps longitudinally rearwardly across the bowling alley when the sensor is in its second ball position 62, to move arm 108 and operate the switch. Suitable deflector means 114a secured to the underside of sensor beam 68 has an inclined face adjacent the lower portion of actuator arms 112 to deflect these arms in such a manner as to avoid jamming these arms 112 against the switch bodies 106.

Whether or not a standing pin is exactly on or off its pin spot, a switch actuator arm 112 of the respective group of switches 104 will detect the pin. Thus, means are provided to indicate the position laterally of the bowling alley of any standing pin.

*The commutator*

With reference to FIGURES 2, 5, and 6, commutator 65 determines the position of sensor 60 longitudinally of the bowling alley and thus identifies the row of any standing pin 22. Commutator 65 has an oscillating core 118 (FIGURES 5 and 6) pivotally mounted between a pair of stationary caps 119 and 120. These commutator caps are firmly secured to pinsetter mounting plate 66, and oscillating core 118 has a radial ear 121 (FIGURE 2) pivotally connected with one end of a link 122 having an opposite end connected with an arm 123 secured to rake supporting rod sleeve 36 for movement with this sleeve. Thus, commutator core 118 oscillates responsive to oscillation of rake rods 36 longitudinally of the bowling alley. Sensor 60 also moves longitudinally of the bowling alley along with rake rods 36 and therefore the position of core 118 corresponds to the position of sensor actuating rods 112.

Figure 11:
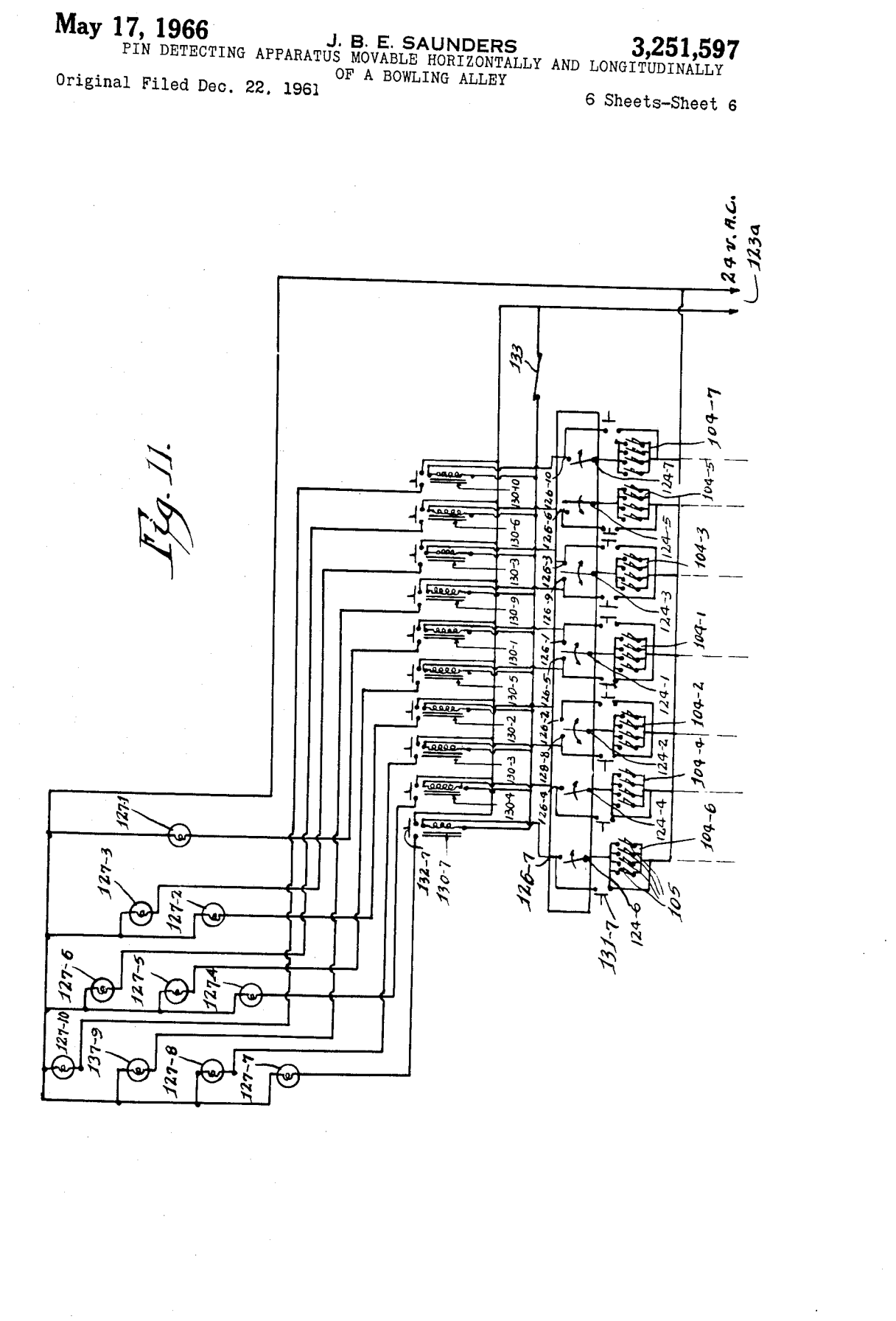

Referring to FIGURES 5, 6, and 11, each group of switches 104-1—104-7 are each in circuit with a source of electrical power 123a, preferably a 24 volt A.C. supply, and one of a plurality of commutator contacts 124-1—124-7. Contacts 124 are insulated from each other and secured in commutator cap 119 with an inner end in contact with an adjacent side face of commutator core 118. Core 118 is preferably of an electrically nonconducting material, and extending therethrough are a plurality of electrically conducting inserts 125-1—125-10 arranged in inner and outer concentric arcuate segments as illustrated in FIGURES 5 and 6, for selectively engaging contacts 124. FIGURES 5 shows a developed section of the outer segment, and FIGURE 6 shows a developed section of the inner segment. Commutator cap 120 carries a plurality of contacts 126-1—126-10, corresponding to ten pins 22-1—22-10, respectively. Contacts 126 are similar to contacts 124 and are each insulated from each other and extend through cap 120 and are in contact with an adjacent side core 118 for selectively engaging inserts 125.

Commutator core inserts 125 have opposite faces opening through the opposite side faces of the core and selectively connect contacts 124 and 126 as sensor 60 sweeps longitudinally rearwardly over the bowling alley so that, with reference to FIGURE 11, switch groups 104-1—104-7 are selectively connected in circuit with suitable indicators 127-1—127-10, one for each ten pin 22-1—22-10. Thus, index means is provided for determining the position of the sensor longitudinally of the bowling alley.

Indicators 127 may be of any suitable type and are illustrated in the preferred embodiment in the form of the electric lights. As sensor 60, in either its first or second ball position, sweeps longitudinally rearwardly over the bowling alley and a switch actuator arm 112 engages a standing pin 22, the respective switch 106 is operated, and in the preferred embodiment is closed. At the same time commutator 65 determines the position of sensor 60 longitudinally of the alley and the proper insert 125 connects appropriate contacts 124 and 126 establishing an electrical circuit to the appropriate light bulb 127 for indicating to the bowler that a particular pin is standing.

As sensing beam 68 sweeps rearwardly from its forwardmost position, as illustrated in FIGURE 2, commutator core 118 is rotated clockwise, as seen in FIGURE 2, from a zero position. Rotation of the core causes contacts 124 and 126 to be selectively connected through inserts 125, as follows, the degrees of rotation of the core from its zero position being approximate: at 19° contacts 124-1 and 126-1 are connected through insert 125-1; at 21° contacts 124-2 and 126-2 are connected by insert 125-3, and contacts 124-3 and 126-3 are connected through insert 125-5; at 33° contacts 124-4 and 126-4 are connected through insert 125-7, contacts 124-1 and 126-5 are connected through insert 125-2, and contacts 124-5 and 126-6 are connected through insert 125-8; and at 45° contacts 125-6 and 126-7 are connected through insert 125-9, contacts 124-2 and 126-8 are connected through insert 125-4, contacts 124-3 and 126-9 are connected through insert 125-6, and contacts 124-7 and 126-10 are connected through insert 125-10. Thus, if the respective switch group 104 is closed the respective indicator 127 will be actuated to indicate that the respective pin is standing on bowling alley bed 29'.

Dashed lines on either side of each bowling pin 22, in FIGURE 2, indicate a "read zone" fore each of the four rows of bowling pins, and the distance actuator arms 112 move while respective contacts 124 and 126 are connected by the respective insert 125. With particular reference to FIGURE 11, the circuits of each light bulb 127 include a holding circuit having a relay 130-1—130-10 corresponding to a respective light bulb. When a switch 106 is closed and a related pair of contacts 124 and 126 is closed by an insert 125, a normally open pair of relay contacts 131-1—131-10 of the respective relay are closed to maintain the respective relay coil energized, and a second pair of relay contacts 132-1—132-10 of the respective relay are also closed to maintain the respective light bulb illuminated. Thus, means is provided to integrate the determinations of the senosr and commutator for determining which pins are standing after the first and second balls of a frame.

Each relay coil is also in circuit with a normally closed master reset switch 133. Any suitable known or otherwise obvious means responsive to the beginning of second ball operation of the pinsetter temporarily opens master reset switch 133 to deenergize the relays 130 and turn-off lights 127. Any suitable known or otherwise obvious timer means responsive to second ball operation of the pinsetter, or strike operation of the pinsetter, temporarily opens master reset switch 133 a limited time after strike or second ball operation of the pinsetter.

With reference to FIGURES 9 and 10, another embodiment of a sensor 60' is illustrated. Sensor 60' has a sensor beam 68' with a plurality of openings 135 each freely receiving pin sensing actuator arms 112'. These arms are identical in function with arms 112. Each arm 112' is firmly secured in an eye 136 of a resilient member having spiral springs 137 extending outwardly in opposite directions from eye 136. Outer ends of these springs are each provided with an eye 138 firmly secured to and suitably insulated from a connector pin 139. Each rod 112' extends downwardly from sensor beam 68' and freely through an eye or halo 140 of a contact member having opposed resilient spiral portions 141 extending upwardly from opposite sides of eye 140 and terminating in eyes 142 at their free ends. Eyes 142 are each connected to and suitably insulated from an adjacent pin 139. Arms 112' are normally spaced from contact member 140 and when deflected by a bowling pin engage their respective contact member. Thus arms 112' and its contact member provide a swtich. These switches are arranged in seven groups of four switches each, as previously described, and each such group is connected in circuit as previously described. Thus, when either the top or bottom ends of an arm 112' engages a standing pin, as previously described, the rod 112' engages its halo 140, closing the switch.

While the detecting apparatus of this invention has been shown and described in conjunction with a standing pin indicator, it should be understood that it will be useful with other forms of indicators such as numerical pinfall indicators for signalling ball or frame pinfall, and cumulative scoring apparatus as well.

I claim:
1. In a bowling pin handling apparatus including mechanism for lifting standing pins off a bowling alley, mechanism movable longitudinally of the alley for clearing the alley of pins and including an arm mounted for pivotal movement about a horizontal axis spaced above the bowling alley, and actuating mechanism therefor responsive to the rolling of a ball on the alley, apparatus for detecting and indicating pinfall comprising: traveler means movable longitudinally of the alley and compris- ing a traveler on each side of the alley and including means mounting said traveler means comprising generally horizontally disposed tracks mounted at opposite sides of the alley; means on each traveler received by an adjacent track; means for converting pivotal movement of said arm into longitudinal movement of said traveler means to move the traveler means in a generally horizontal plane longitudinally of the alley responsive to pivotal movement of the arm; a sensor mounted on said traveler means for movement therewith and for movement vertically of the alley between first and second ball positions; a drive member responsive to operation of the actuating mechanism; means actuated by said drive member for selectively positioning said sensor in said first and second ball positions; sensing means on said sensor for engaging the bottom portions of standing pins lifted off the bowling alley when the sensor is in said first ball position and for engaging the heads of standing pins on the bowling alley when the sensor is in said second ball position to determine pin position laterally of the alley; cooperating means for identifying standing pins including said sensing means and indexing means for determining the position of said sensing means longitudinally of the alley; means for positioning said indexing means in time with sensor movement longitudinally of the alley; means responsive to said cooperating means for indicating pinfall, means mounting said sensor on said traveler means comprising an arm movably connected with said traveler means and said sensor; and means for releasably holding said sensor in said first and second ball positions comprising a lock lever pivoted to said traveler means; a cam at the forward end of the track carrying said traveler means and releasably engaging said lock lever to hold the lever in released position when said traveler is adjacent the cam and to release the lever for movement to lock position as the traveler is moved rearwardly across the bowling alley; and cooperating means on said lock lever and said arm for releasably retaining the sensor in said first or second ball position as determined by said actuating mechanism.

2. In a bowling pin handling apparatus including mechanism for lifting standing pins off a bowling alley, mechanism movable longitudinally of the alley for clearing the alley of pins and including an arm mounted for pivotal movement about a horizontal axis spaced above the bowling alley, and actuating mechanism therefor responsive to the rolling of a ball on the alley, apparatus for detecting and indicating pinfall comprising: traveler means movable longitudinally of the alley and comprising a traveler on each side of the alley and including means mounting said traveler means comprising generally horizontally disposed tracks mounted at opposite sides of the alley; means on each traveler received by an adjacent track; means for converting pivotal movement of said arm into longitudinal movement of said traveler means to move the traveler means in a generally horizontal plane longitudinally of the alley responsive to pivotal movement of the arm; a sensor mounted on said traveler means for movement therewith and for movement vertically of the alley between first and second ball positions; a drive member responsive to operation of the actuating mechanism; means actuated by said drive member for selectively positioning said sensor in said first and second ball positions; sensing means on said sensor for engaging the bottom portions of standing pins lifted off the bowling alley when the sensor is in said first ball position and for engaging the heads of standing pins on the bowling alley when the sensor is in said second ball position to determine pin position laterally of the alley; cooperating means for identifying standing pins including said sensing means and indexing means for determining the position of said sensing means longitudinally of the alley; means for positioning said indexing means in time with sensor movement longitudinally of the alley; means responsive to said cooperating means for indicating pinfall, means mounting said sensor for movement vertically of the alley comprising a pair of parallel arms for each of said travelers, the arms of each pair having adjacent ends pivoted to spaced portions of the respective traveler and opposite ends pivoted to said sensor; said means for selectively positioning said sensor in first and second positions comprising first and second ball links having opposite ends, lost motion connections with said drive member at first ends of said links, the first ball link having a greater lost motion stroke than the second ball link; an idler lever pivotally connected with the other ends of said links; link means connected at opposite ends with said lever and said opposite end of one of said arms; means for releasably locking said lost motion connection of said first ball link during first ball operation of said actuating mechanism for movement of said first ball link with said member to position said sensor in said first ball position; and means for releasing said first ball link for second ball operation to move said second ball link with said member and position said sensor in said second ball position.

3. In a bowling pin handling apparatus including mechanism for lifting standing pins off a bowling alley mechanism movable longitudinally of the alley for clearing the alley of pins and including an arm mounted for pivotal movement about a horizontal axis spaced above the bowling alley, and actuating mechanism therefor responsive to the rolling of a ball on the alley, apparatus for detecting and indicating pinfall comprising: traveler means movable longitudinally of the alley and comprising a traveler on each side of the alley and including means mounting said traveler means comprising generally horizontally disposed tracks mounted at opposite sides of the alley; means on each traveler received by an adjacent track; means for converting pivotal movement of said arm into longitudinal movement of said traveler means to move the traveler means in a generally horizontal plane longitudinally of the alley responsive to pivotal movement of the arm; a sensor mounted on said traveler means for movement therewith and for movement vertically of the alley between first and second ball positions; a drive member responsive to operation of the actuating mechanism; means actuated by said drive member for selectively positioning said sensor in said first and second ball positions; sensing means on said sensor for engaging the bottom portions of standing pins lifted off the bowling alley when the sensor is in said first ball position and for engaging the heads of standing pins on the bowling alley when the sensor is in said second ball position to determine pin position laterally of the alley; cooperating means for identifying standing pins including said sensing means and indexing means for determining the position of said sensing means longitudinally of the alley; means for positioning said indexing means in time with sensor movement longitudinally of the alley; means responsive to said cooperating means for indicating pinfall, said means for converting pivotal movement of said arm into longitudinal movement of said traveler means comprising a sleeve pivotally mounted on one of said travelers and having said arm telescopically received therein.

4. In a bowling pin handling apparatus including
 (a) mechanism for lifting standing pins off a pin spot area on a bowling alley,
 (b) mechanism movable longitudinally of the alley for clearing the alley of pins and including an arm mounted for pivotal movement about a fixed horizontal axis spaced above the pin spot area on the bowling alley, and
 (c) actuating mechanism therefor responsive to the rolling of a ball on the alley,
apparatus for detecting and indicating pinfall comprising:
 (d) traveler means movable horizontally longitudinally of the alley and comprising a traveler on each side of the alley and including (e) means mounting said traveler means comprising horizontal tracks mounted at opposite sides of the alley,
(f) means on each traveler received by an adjacent track confining the traveler for horizontal movement,
(g) means for converting pivotal movement of said arm into longitudinal movement of said travelers in a horizontal path longitudinally of the alley responsive to pivotal movement of the arm,
(h) a sensor mounted on said travelers for movement therewith and for movement vertically of the alley between first ball and second ball positions,
(i) a drive member responsive to operation of the actuating mechanism,
(j) means actuated by said drive member for selectively positioning said sensor in said first ball and second ball positions,
(k) sensing means on said sensor movable past the bottom portions of pins lifted off the bowling alley when the sensor is in said first ball position and past the heads of standing pins on the bowling alley when the sensor is in said second ball position to detect pin presence and pin position laterally of the alley,
(l) commutator means movable in timed relation with the sensor and representative of the position of the sensor longitudinally of the alley, and
(m) means responsive to said sensing means and said commutator means for indicating pinfall.

5. The combination of claim 4 wherein said means on each traveler received by an adjacent track comprises rollers mounted on an upper portion of the respective traveler.

6. The combination of claim 4 including means mounting said sensor for movement vertically of the alley comprising a pair of parallel arms for each of said travelers, the arms of each pair having adjacent ends pivoted to spaced portions of the respective traveler and opposite ends pivoted to said sensor.

References Cited by the Examiner
UNITED STATES PATENTS

| | | | |
|---|---|---|---|
| 2,702,707 | 2/1955 | Frye | 273—43 |
| 2,942,884 | 6/1960 | Scherzinger | 273—54 |
| 2,991,078 | 7/1961 | Hedenskoog et al. | 273—54 X |
| 3,070,369 | 12/1962 | Dowd et al. | 273—43 |

DELBERT B. LOWE, *Primary Examiner.*

ANTON O. OECHSLE, *Assistant Examiner.*